United States Patent
Or et al.

(10) Patent No.: US 7,775,333 B2
(45) Date of Patent: Aug. 17, 2010

(54) MAGNETORHEOLOGICAL DAMPER AND USE THEREOF

(75) Inventors: Siu Wing Or, Kowloon (CN); Yiqing Ni, Kowloon (CN); Yuanfeng Duan, Kowloon (CN)

(73) Assignee: The Hong Kong Polytechnic University, Hong Kong SAR (CN)

( * ) Notice: Subject to any disclaimer, the term of this patent is extended or adjusted under 35 U.S.C. 154(b) by 0 days.

(21) Appl. No.: 11/808,136

(22) Filed: Jun. 6, 2007

(65) Prior Publication Data

US 2008/0128230 A1 Jun. 5, 2008

Related U.S. Application Data (63) Continuation of application No. 11/185,026, filed on Jul. 20, 2005, now abandoned.

(51) Int. Cl.
*F16F 9/53* (2006.01)
(52) U.S. Cl. ................ 188/267.2; 188/321.11
(58) Field of Classification Search ............. 188/267, 188/267.2, 321.11; 73/862.621, 862.635, 73/862.642
See application file for complete search history.

(56) References Cited

U.S. PATENT DOCUMENTS

| | | | |
|---|---|---|---|
| 3,890,591 A | 6/1975 | Bocquillon et al. | |
| 4,240,296 A | 12/1980 | Kolodziej | |
| 4,633,982 A | 1/1987 | Swigert | |
| 4,800,751 A | 1/1989 | Kobayashi et al. | |
| 4,824,180 A | 4/1989 | Levrai | |
| 4,892,328 A | 1/1990 | Kurtzman et al. | |
| 5,394,852 A | 3/1995 | McAlister | |
| 5,396,973 A | 3/1995 | Schwemmer et al. | |
| 5,547,049 A | 8/1996 | Weiss et al. | |
| 5,609,230 A | 3/1997 | Swinbanks | |
| 5,979,218 A | 11/1999 | Biddle et al. | |
| 6,158,470 A * | 12/2000 | Ivers et al. ............ | 137/807 |
| 6,427,813 B1 | 8/2002 | Carlson | |
| 6,516,657 B2 | 2/2003 | Shirato et al. | |
| 6,600,285 B2 | 7/2003 | Mintgen et al. | |
| 6,756,722 B2 | 6/2004 | Hiramatsu | |
| 6,866,127 B2 | 3/2005 | Nehl et al. | |

(Continued)

FOREIGN PATENT DOCUMENTS

DE 10161972 6/2003

(Continued)

OTHER PUBLICATIONS

Translated abstract of the DE document No. 10161972 provided by applicant (according to its WO equivalent).*

*Primary Examiner*—Pam Rodriguez
(74) *Attorney, Agent, or Firm*—Jacobson Holman PLLC (57) ABSTRACT

An magnetorheological damper useful in structural vibration control has a damper body and a moveable portion relative to the damper body. The damper includes an magnetorheological material contained within the damper body for resisting movement of the moveable portion. Rheology changes can be generated in the magnetorheological material owing to changes in a magnetic field, to which the magnetorheological material is exposed. The damper further includes at least a sensor embedded in the damper for monitoring an external force exerted on the damper, and for generating a signal to control the magnetic field and hence the resulting yield force and rheological damping of the damper in response to a variance in the external force.

11 Claims, 8 Drawing Sheets

U.S. PATENT DOCUMENTS

| | | |
|---|---|---|
| 6,868,946 B2 | 3/2005 | Kock et al. |
| 6,959,795 B2 | 11/2005 | Kienholz |
| 2001/0035725 A1 | 11/2001 | Mintgen et al. |
| 2002/0121846 A1 | 9/2002 | Lee et al. |
| 2002/0195917 A1 | 12/2002 | Hiramatsu |
| 2003/0155194 A1 | 8/2003 | Kienholz |
| 2003/0222540 A1 | 12/2003 | Lee et al. |
| 2004/0089506 A1 | 5/2004 | Nehl et al. |

FOREIGN PATENT DOCUMENTS

RU 2232316 C2 * 7/2004

* cited by examiner

(a) Whole-face electrode pattern
(b) Inner electrode pattern
(c) In-between electrode pattern
(d) Outer electrode pattern

Fig. 9

(a) Quasi-sinusoidal force (b) Square force

MAGNETORHEOLOGICAL DAMPER AND USE THEREOF

This is a continuation of application Ser. No. 11/185,026 filed Jul. 20, 2005, now abandoned.

BACKGROUND

1. Field of the Invention

The present application relates to structural vibration control mechanism, and particularly to magnetorheological (MR) dampers useful in such controls.

2. Background of the Invention

Magnetorheological (MR) dampers have been used in vibration control of civil and mechanical structures. Application examples include vibration damping of the suspension cables in cable-stayed bridges, vibration damping of automotive seats and suspension systems, and vibration isolation of automation and/or precision equipment/machines, to name a few. The MR materials used in the MR dampers have the ability to reversibly change their rheological characteristics upon applying a magnetic field. In more details, they can change themselves from a free-flowing, linear viscous fluid to a semi-solid with adjustable/controllable yield stress in milliseconds when exposed to an applied magnetic field. By inputting different electrical currents to the electromagnet of such an MR damper. It can adjust/control the magnetic field applied to the MR material so that the yield stress of the material and hence the yield force and rheological damping of the damper can readily be adjusted/controlled in milliseconds. While possessing adjustable/controllable yield force and rheological damping capabilities, the existing MR dampers are incapable of sensing structural vibrations for implementing real-time, close-loop vibration controls; they are only limited to an open-loop mode of operation instead, and their adjustable/controllable capability cannot be fully utilized.

Technological advancement of structural vibration controls from an open-loop to a close-loop operation of MR dampers requires the development of an accurate inverse dynamic model for the dampers so as to determine appropriate current inputs for facilitating the desired yield force and rheological damping. Nevertheless, it is still a challenge to develop such an inverse dynamic model for these highly nonlinear dampers. Alternatively, a force feedback control loop is often deployed to overcome the deficiency of implementing inverse dynamic modeling via an installation of force sensors between the vibrating structures and the dampers at the expense of reducing the control effectiveness and increasing both the implementation difficulty and engineering cost.

OBJECT OF THE INVENTION

Therefore, it is an object of the present invention to provide an improved magnetorheological damper, wherein real-time adjustment/control of its yield force and rheological damping can be achieved, or at least provide the public with a useful choice.

It is a further object of the present invention to provide an improved structural vibration control system, which can be sensitive to, variances in structural vibrations, or at least provide the public with a useful choice.

SUMMARY OF THE INVENTION

According to an aspect of the present invention, an magnetorheological damper useful in structural vibration control has a damper body and a moveable portion relative to the damper body. The damper includes an magnetorheological material contained within the damper body for resisting movement of the moveable portion. Rheology changes can be generated in the magnetorheological material owing to changes in a magnetic field, to which the magnetorheological material is exposed. The damper further includes at least a sensor embedded in the damper for monitoring an external force exerted on the damper, and for generating a signal to control the magnetic field and hence the resulting yield force and rheological damping of the damper in response to a variance in the external force.

According to a second aspect of the present invention, a structural vibration control system includes:
- at least an magnetorheological damper, having a damper body and a moveable portion relative to the damper body, including
  - an magnetorheological material contained within the damper body for resisting movement of the moveable portion, wherein rheology changes can be generated in the magnetorheological material owing to changes in a magnetic field, to which the magnetorheological material is exposed; and
  - at least a sensor embedded in the damper for monitoring an external force exerted on the damper, and for generating a signal to control the magnetic field and hence the resulting yield force and rheological damping of the damper in response to a variance in the external force; and
- means for receiving the signal from the sensor and for varying the magnetic field in accordance with the signal.

Preferably, the sensor is a piezoelectric sensor.

Other aspects and advantages of the invention will become apparent from the following detailed description, taken in conjunction with the accompanying drawings, which description illustrates by way of example the principles of the invention.

DETAILED DESCRIPTION

Figure 1:
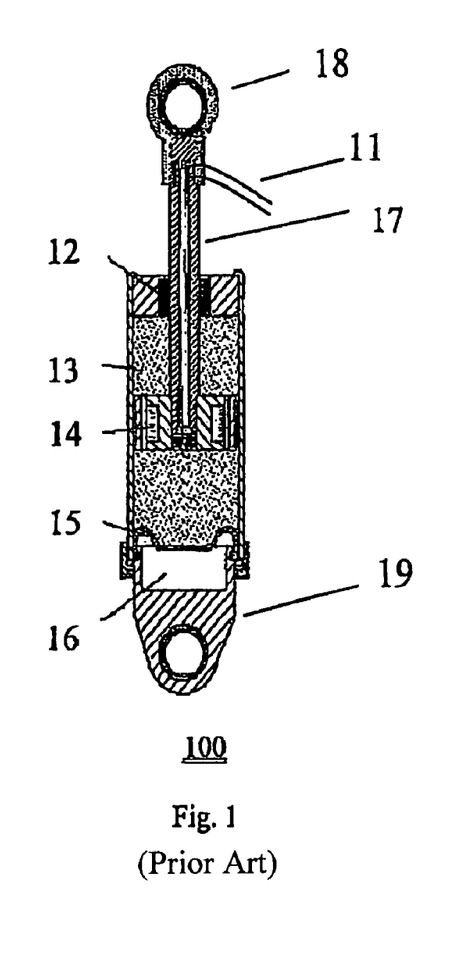
FIG. 1 is a plan view of a traditional linear magnetorheological damper.

FIG. 1 illustrates a conventional magnetorheological (MR) damper 100 known in the art. The conventional MR damper 100 generally includes a pair of electrical wires 11, a bearing and seal unit 12, a cylinder housing MR material or fluid 13, an electromagnet 14, a diaphragm 15, an accumulator 16, a piston 17, an upper connection support 18, and a lower connection support 19. The bearing and seal unit 12 guides the movement of the piston 17 and prevents the leakage of the MR material 13. By applying different current inputs to the electromagnet 14 through a pair of electrical wires 11, the MR material 13 may be reversibly changed from a free-flowing, linear viscous fluid to a semi-solid with adjustable/controllable yield stress such that the yield force and rheological damping of the damper can be changed accordingly.

Such or similar conventional dampers are generally known in the field. See, for example, U.S. Pat. No. 6,394,239, entitled "Controllable medium device and apparatus utilizing same" and filed by David J. Carlson on Oct. 29, 1997; U.S. Pat. No. 6,378,631 entitled "Apparatus for recovering core samples at in situ conditions" and filed by Aumann et al. on Jun. 30, 2000; U.S. Pat. No. 6,158,470 entitled "Two-way magnetorheological fluid valve assembly and devices utilizing same" and filed by Ivers et al. on Feb. 11, 2000; U.S. Pat. No. 6,131,709 entitled "Adjustable valve and vibration damper utilizing same" and filed by Jolly et al. on Nov. 25, 1997; U.S. Pat. No. 6,095,486 entitled "Two-way magnetorheological fluid valve assembly and devices utilizing same" and filed by Ivers et al. on Mar. 5, 1997; U.S. Pat. No. 5,878,851 entitled "Controllable vibration apparatus" and filed by Carlson et al. on Jul. 2, 1999; U.S. Pat. No. 5,398,917 entitled "Magnetorheological fluid devices" and filed by Carlson et al. Feb. 7, 1994: U.S. Pat. No. 5,284,330 entitled "Magnetorheological fluid devices" and filed by Carlson et al. on Jun. 18, 1992; U.S. Pat. No. 5,277,281 entitled "Magnetorheological fluid dampers" and filed by Carlson et al. on Jun. 18, 1992. All these references are herein incorporated by reference.

Figure 2:
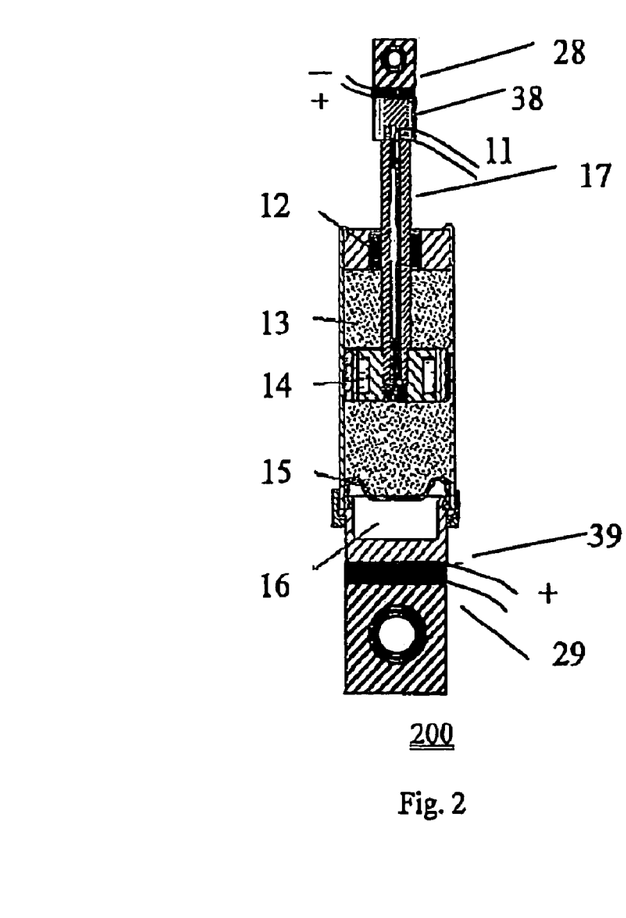
FIG. 2 is a plan view of an exemplary magnetorheological damper according to an embodiment of the present invention.

FIG. 2 illustrates an exemplary MR damper embodiment 200 of the present invention. Similar to the conventional MR damper 100 of FIG. 1, the MR damper 200 also includes a pair of electrical wires 11, a bearing and seal unit 12, a cylinder housing MR material or fluid 13, an electromagnet 14, a diaphragm 15, an accumulator 16, and a piston 17. The MR damper 200 further includes a first piezoelectric sensor 28 and a second piezoelectric sensor 29 for measuring the external forces exerted on the damper due to structural vibrations. The piezoelectric sensors 28 and 29 are, respectively, attached to the lower part 38 of the upper connection support 18 and the lower part 39 of the lower connection support 19 in this invention by substituting part of the upper connection support 18 and lower connection support 19 of the conventional damper 100 shown in FIG. 1. These locations may essentially assure the MR damper 200 that its embedded piezoelectric sensors 28 and 29 are: 1) capable of producing strong output signals in proportional to the external forces (i.e., good mechanical coupling and linearity); 2) sensitive to the variances in the external forces; and 3) ease of installation. The piezoelectric sensors 28 and 29 sense the variances in the external forces exerted on the damper due to structural vibrations and generate electrical signals in accordance with the variances in the external forces imposed onto their electroded surfaces (i.e., the pressures; to be described in FIG. 8), which signals can be used to assist adjusting/controlling the current inputs to the electromagnet 14 so as to adjust/control the magnetic field applied to the damper and hence the resulting yield force and rheological damping of the damper. Since the piezoelectric sensors 28 and 29 are capable of monitoring real-time variances in the external forces (or pressures), real-time adjustment/control of the yield force and rheological damping of the damper can also be achieved.

As understood in the art, the piezoelectric sensors 28 and 29 can be all the same except that their sizes may be different. As also understood in the art, MR dampers with a single sensor can be developed by solely using either piezoelectric sensor 28 or piezoelectric sensor 29 of FIG. 2. However, the duel-sensor design shown in FIG. 2 provides a more accurate and reliable measurement of structural vibrations as compared with the single-sensor designs.

Figure 3:
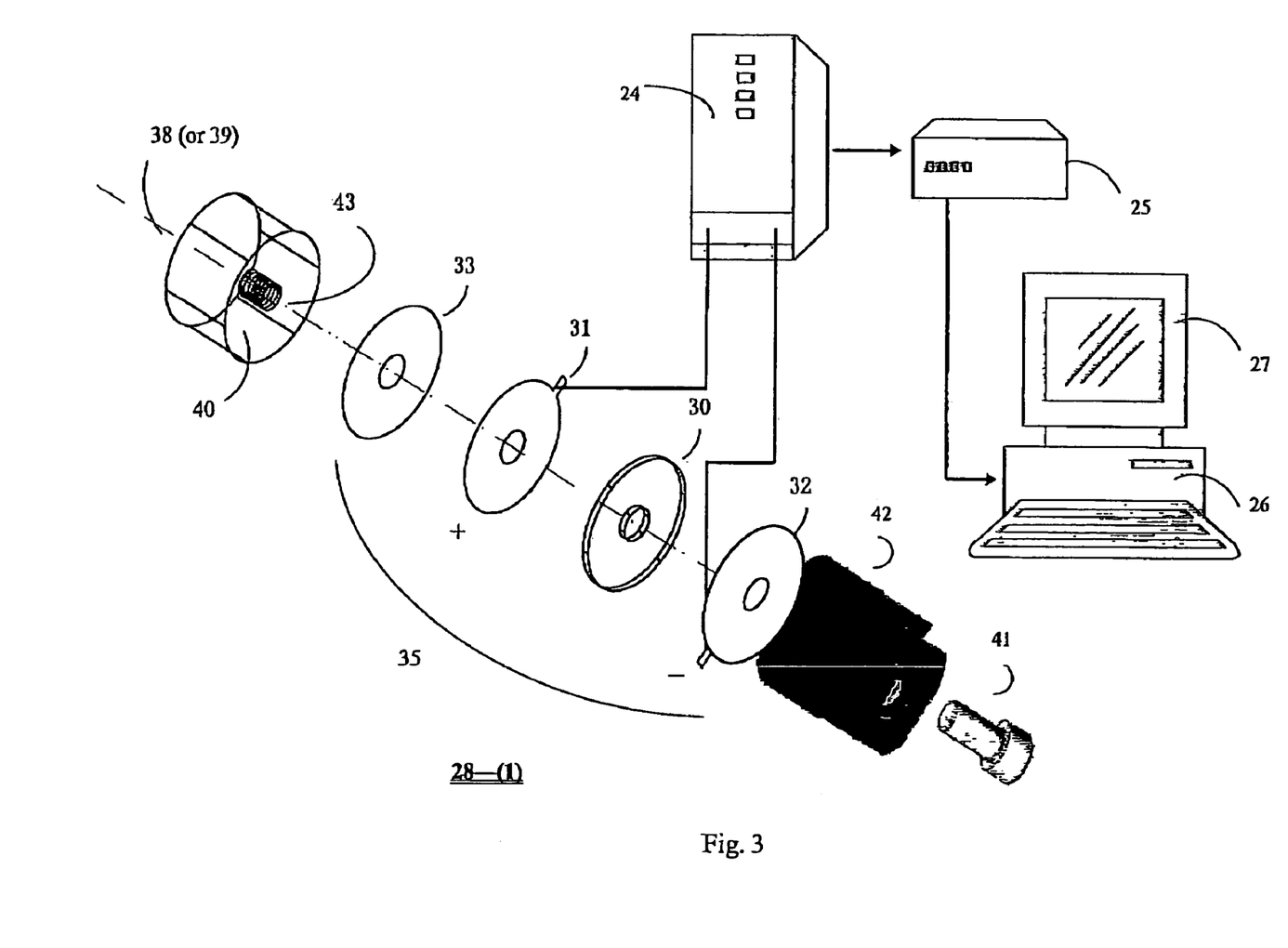
FIG. 3 is an exploded isometric view of sensor components of a first sensor useful in the damper of FIG. 2.

In FIG. 3, sensor components of a first exemplary sensor are shown and include two wafer electrodes 31 and 32 mounted on either side of a piezoelectric wafer 30. For simplicity of description, wafer electrode 31 is set as the positive, while electrode 32 is set as the negative. Insulating wafer 33 is mounted between the electrode 31 and the neighboring surface 40 of the lower part of a connection support that, referring to FIG. 2, corresponds to the lower part 38 of the upper connection support 18 or the lower part 39 of the lower connection support 19. These sensor components are sandwiched centrally in a stack 35 under the mechanical pressure by using a threaded shaft 41 protruding from a new connection support 42 to a shaft hole 43 opened in the lower part (38 or 39) of a connection support (38 or 39). The preloading pressure is large enough so that the piezoelectric wafer 30 remains in compression during operation. The threaded shaft 41 should be insulated from the wafer electrodes 31 and 32 and piezoelectric wafer 30. Electrical wires (not shown) are connected in use to the wafer electrodes 31 and 32 to deliver electrical charges (and hence voltages) generated from the piezoelectric wafer 30, through a signal conditioning unit 24, and a data acquisition unit 25. The results can be recorded and processed using a personal computer 26 and displayed on a monitor 27. This enables the external forces (or pressures) to be monitored in the operation of the damper. In addition, as understood in the art, real-time adjustment/control of the yield force and rheological damping can also be achieved by using said results to adjust/control the current inputs to the electromagnet 14.

Figure 4:
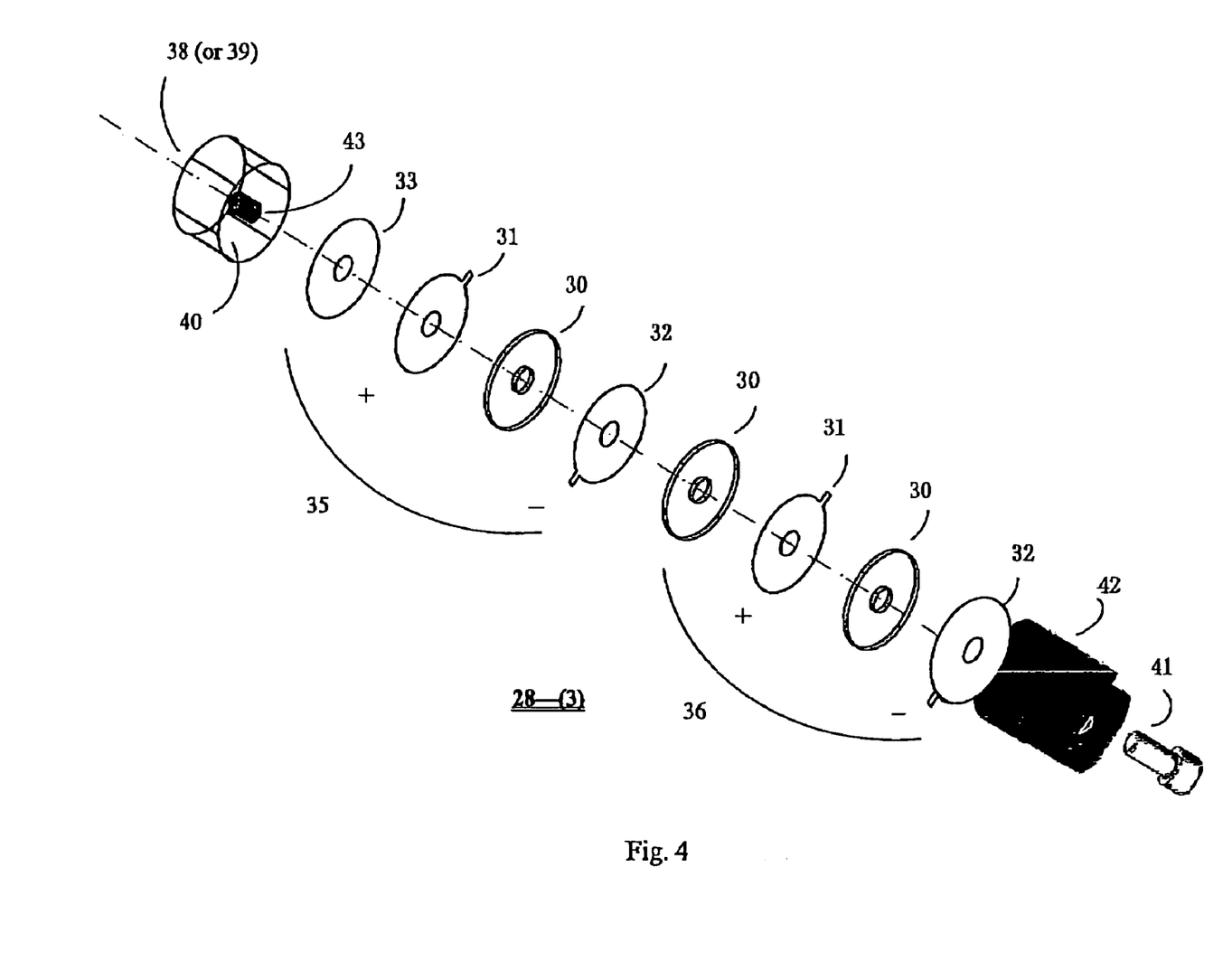
FIG. 4 is an exploded isometric view of sensor components of a second sensor useful in the damper of FIG. 2.

In FIG. 4, a stack 36 including another two piezoelectric wafers 30 and two wafer electrodes 31 and 32 are added to the sensor shown in FIG. 3. The piezoelectric wafers and the wafer electrodes are placed in alternating order. By connecting all the positive wafer electrodes together as one node, and all the negative ones as another, the charges generated from the two nodes representing the effect of all the three piezoelectric wafers can be obtained to monitor the external forces exerted on the damper. In such a way, the sensitivity of the sensor can be enhanced. Similarly, by adding more stacks 36, five, seven, and more piezoelectric wafers can be deployed to enhance the sensor sensitivity.

Figure 5:
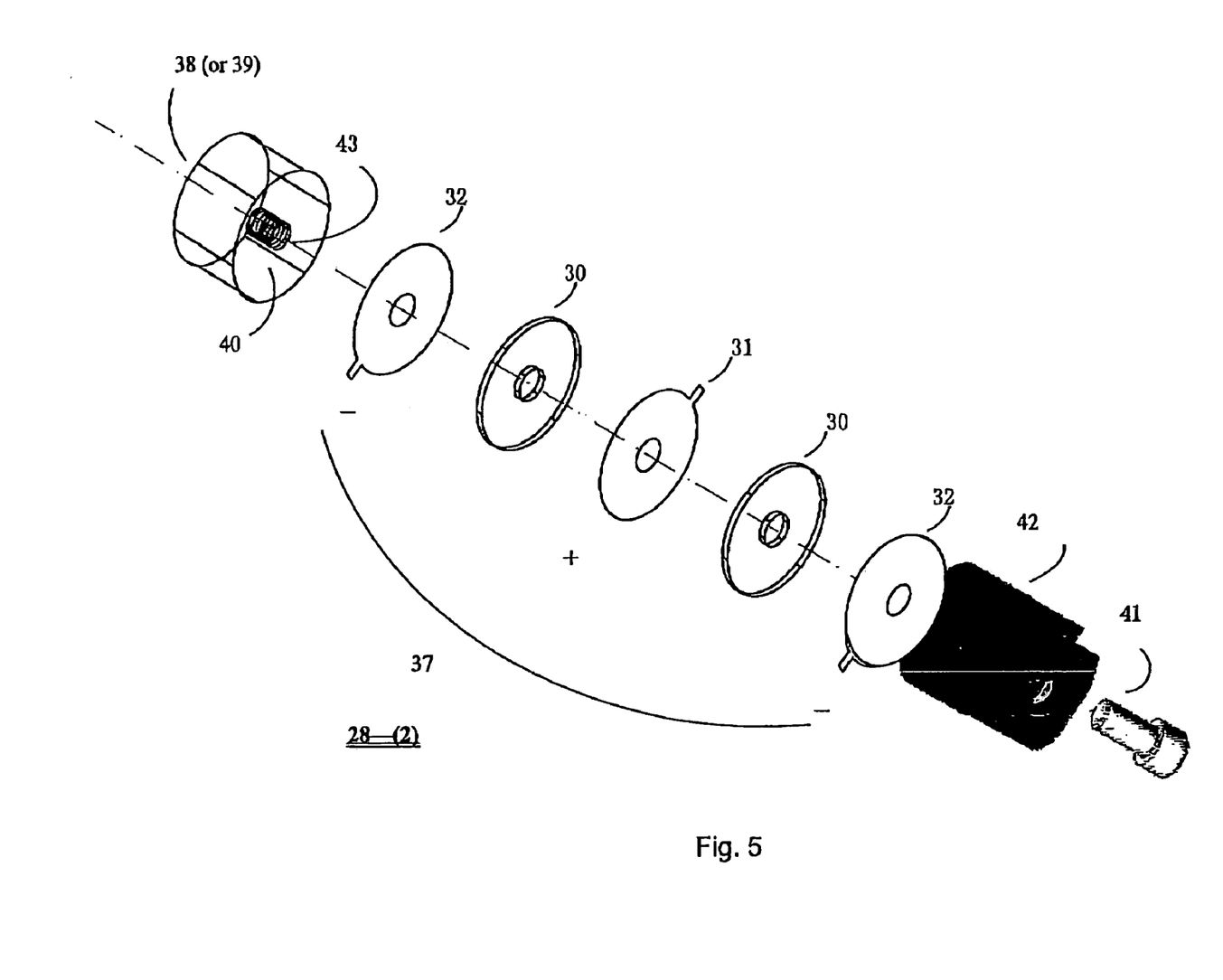
FIG. 5 is an exploded isometric view of sensor components of a third sensor useful in the damper of FIG. 2.

In FIG. 5, two piezoelectric wafers 30 are deployed with three wafer electrodes (two 32 and one 31) in an alternating order to form the stack 37. The charges generated from the positive wafer electrode 31 and the two negative wafer electrodes 32 can be obtained for monitoring the external forces exerted on the damper. In this case of deploying two piezoelectric wafers, the insulating wafer 33 as in the stack 35 (of FIGS. 3 and 4) may not be necessary in that one of the piezoelectric wafers also functions as an insulating wafer.

Figure 6:
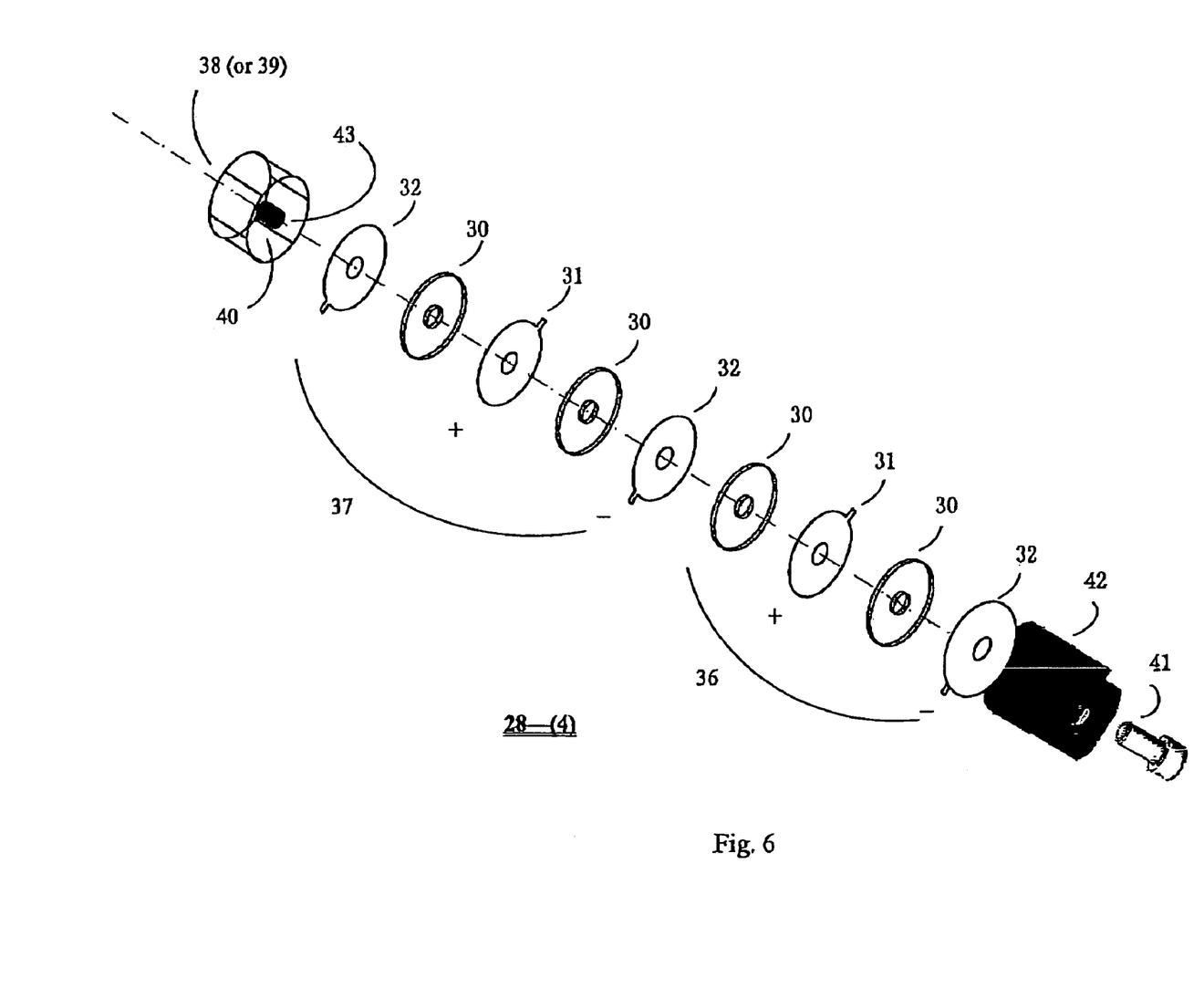
FIG. 6 is an exploded isometric view of sensor components a fourth sensor useful in the damper of FIG. 2.

In FIG. 6, by adding a stack 36 (the same as in FIG. 5) to the stack 37, four piezoelectric wafers can be deployed. Similarly, by adding more stacks 36, six, eight, and more piezoelectric wafers can be deployed in monitoring the external forces with improved sensor sensitivity.

Figure 7:
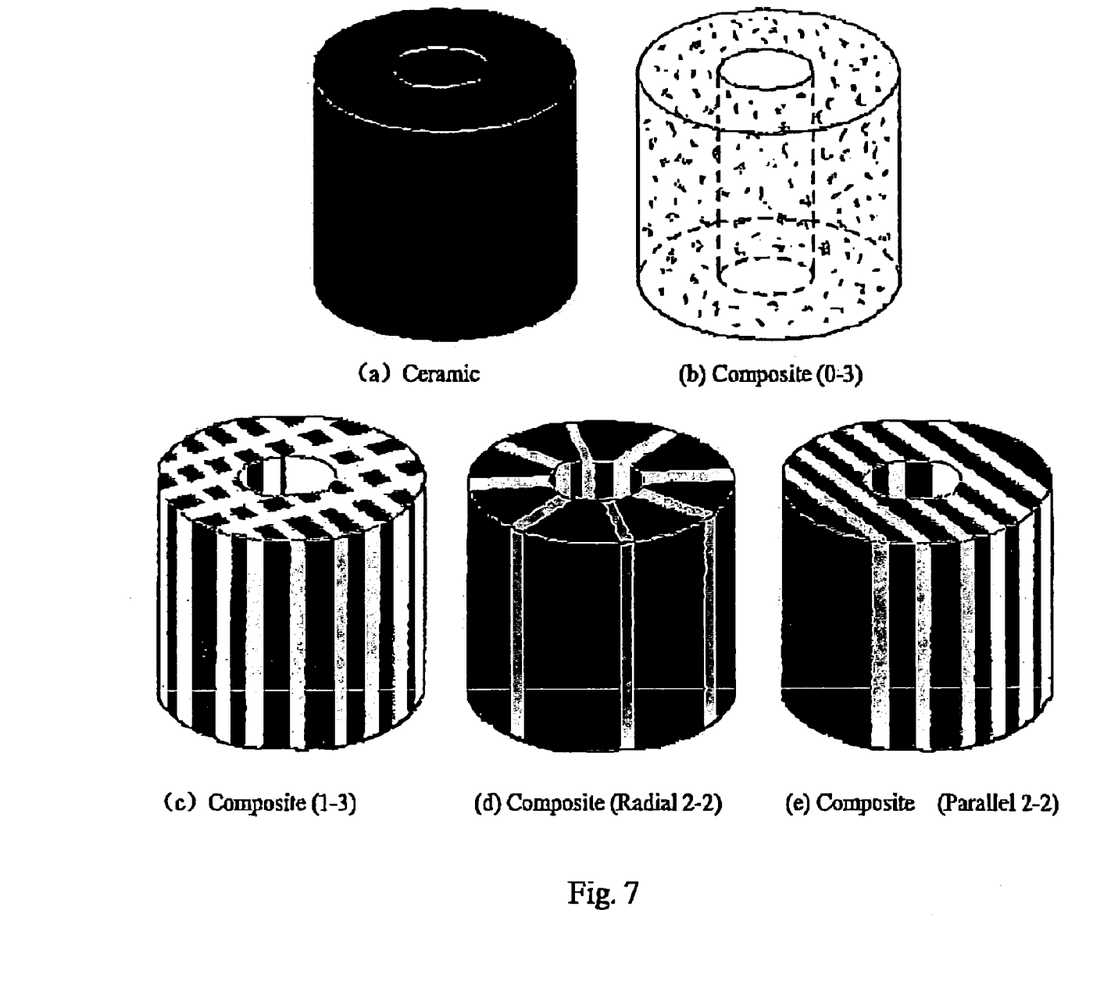
FIG. 7 is an isometric view of piezoelectric wafers of the sensor of FIGS. 3-6, made of different piezoelectric materials.

The piezoelectric wafer 30 can be any suitable piezoelectric material including piezoelectric ceramics, polymers, and composites due to their effectiveness over a large frequency range, simplicity, reliability, compactness, and light weight. In FIG. 7, a piezoelectric ceramic element and four piezoelectric ceramic/polymer composite elements with different configurations: namely, the 0-3, 1-3, radial 2-2, and parallel 2-2 configurations, are presented in this invention. Usually piezoelectric ceramic sensors have sharp resonances and high sensitivity within a narrow bandwidth. Signals with frequencies within their resonances will be greatly amplified and artifacts may be created. As ceramics are hard and brittle, it is difficult to produce ceramic sensors with large element size and complex shape and damage caused by mechanical shock or vibration is more serious. Piezoelectric polymer sensors, however, have wider bandwidth, and all signals will be received with more or less equal sensitivity over a wide range of frequency. They can be fabricated into complex shapes and are more resilient to mechanical stress as they are more flexible. Their major drawbacks are lower sensitivity and less temperature stability. Piezoelectric composite sensors, on the other hand, can be tailored to combine the desired properties of ceramics and polymers and may be most suitable for this sensor.

Figure 8:
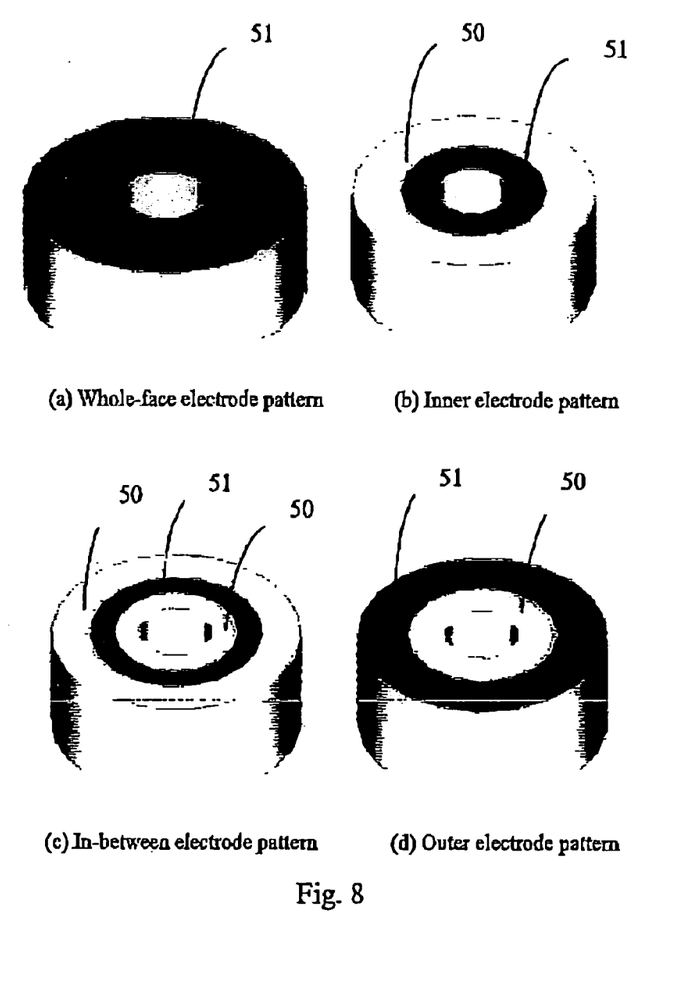
FIG. 8 is an isometric view of piezoelectric wafers of the sensor of FIGS. 3-6, with different electrical patterns.

In FIG. 8, different electrode patterns for the wafer 30 are presented by the forms of an "active" area 51 and an "Inactive" area 50. According to the relative position of the "active" and "Inactive" areas, whole-face (FIG. 8a), inner (FIG. 8b), in-between (FIG. 8c), and outer (FIG. 5d) electrode patterns are clarified. Such electrode patterns can be used for the wafer 30 of any kind of material among ceramics, polymers, and composites as mentioned before.

Figure 9:
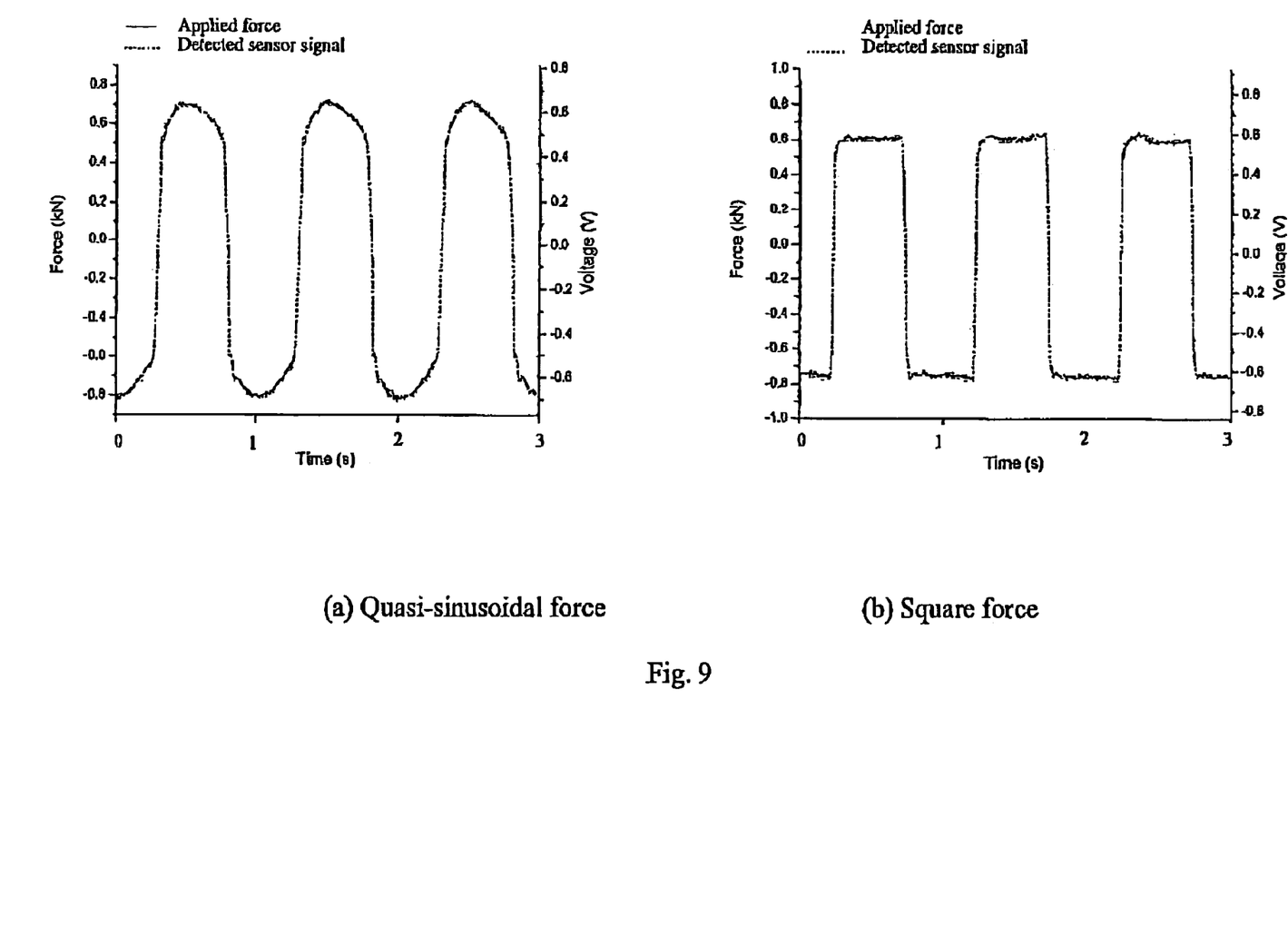
FIG. 9 illustrates two test results of the sensor.

In FIG. 9, two test results show that the quasi-sinusoidal (FIG. 9a) and square (FIG. 9b) forces exerted on the damper including both the amplitude and phase can be finely monitored by measuring the charges generated from the piezoelectric sensor(s) (28 and/or 29) and displayed on the monitor 27 of FIG. 3 as voltages.

Whereas all the described wafers are cylindrical, embodiments of the invention can be provided with other shaped wafers including irregular and rectangular cross-sectioned uniform or composite wafers.

What is claimed is:

1. An magnetorheological damper useful in structural vibration control, having an upper connection support with an upper part, a lower connection support having a lower part and a damper body therebetween, and a moveable portion moveable relative to the damper body, the magnetorheological damper comprising:
   an magnetorheological material contained within the damper body for resisting movement of the moveable portion, wherein rheology changes can be generated in the magnetorheological material owing to changes in a magnetic field, to which the magnetorheological material is exposed;
   said magnetorheological material being located within said dampener body between said upper connection support and said lower connection support so as to provide dampening of external forces imparted to and across the damper through the connection supports;
   a first sensor attached to the upper part of the upper connection support and a second sensor attached to the lower connection support, the first sensor and the second sensor embedded in the damper for generating a signal to control the magnetic field and hence the resulting yield force and rheological damping of the damper in response to a variance in the external force applied to the support connections and across the damper;
   the first sensor and the second being piezoelectric sensors, said first and second sensors each including at least one pair of planar electrodes separated by a piezoelectric wafer and held together in a stack against one another under pressure.

2. The damper of claim 1, wherein the first and second sensors further includes an insulating wafer for insulating one of the electrodes.

3. The damper of claim 1, wherein the piezoelectric wafers are cylindrical.

4. The damper of claim 1, wherein the piezoelectric wafers are made of one of piezoelectric ceramic, polymer, and composite materials.

5. The damper of claim 1, wherein the first and second sensors include a plurality of pairs of planar electrodes each separated by a piezoelectric wafer, and wherein the pairs of planar electrodes and wafers are held together in a stack against one another under pressure.

6. The damper of claim 5, wherein if the number of the piezoelectric wafers is odd, the sensor further includes an insulating wafer for insulating one of the electrodes.

7. The damper of claim 5, wherein the piezoelectric wafers are cylindrical.

8. The damper of claim 5, wherein the piezoelectric wafers are made of one of piezoelectric ceramic, polymer, and composite materials.

9. The damper of claim 5, wherein the piezoelectric wafers are made in different electrode patterns, or different forms of "active" and "inactive" areas.

10. The damper of claim 9, wherein the different electrode patterns are selected from the group consisting of whole-face, inner, in-between, and outer electrode patterns, and their combinations.

11. A structural vibration control system, comprising:
   at least an magnetorheological damper, having an upper connection support having an upper part, a lower connection support having a lower part and a damper body therebetween, and a moveable portion moveable relative to the damper body, the magnetorheological damper including
   an magnetorheological material contained within the damper body for resisting movement of the moveable portion, wherein rheology changes can be generated in the magnetorheological material owing to changes in a magnetic field, to which the magnetorheological material is exposed;
   an electromagnet for providing changes in magnetic field to which the magnetorheological material is exposed; and
   a first sensor attached to the upper part of the upper connection support and a second sensor attached to the lower connection support, the first sensor and the second sensor embedded in the damper, said first and second sensors for detecting external forces applied to the upper connection support and the lower connection support and for generating a signal to control the magnetic field provided by the electromagnet and hence the resulting yield force and rheological damping of the damper in response to a variance in the external force; and
   means for receiving the signal from the first and second sensors and for varying the magnetic field in accordance with the signal;
   the first and second sensors being a piezoelectric sensor, said sensors each including at least one pair of planar electrodes separated by a piezoelectric wafer, held together in a stack against one another under pressure.

* * * * *